US012291369B2

(12) United States Patent
Nekkanti

(10) Patent No.: US 12,291,369 B2
(45) Date of Patent: May 6, 2025

(54) INTELLIGENT SYSTEMS FOR OPTIMIZING STRETCH WRAPPER OPERATION AND STRETCH FILM USAGE

(71) Applicant: ATLANTIC CORPORATION OF WILMINGTON, INC., Wilmington, NC (US)

(72) Inventor: Shantharam Nekkanti, Charlotte, NC (US)

(73) Assignee: ATLANTIC CORPORATION OF WILMINGTON, INC., Wilmington, NC (US)

( * ) Notice: Subject to any disclaimer, the term of this patent is extended or adjusted under 35 U.S.C. 154(b) by 81 days.

(21) Appl. No.: 17/738,405

(22) Filed: May 6, 2022

(65) Prior Publication Data

US 2022/0355962 A1  Nov. 10, 2022

Related U.S. Application Data

(60) Provisional application No. 63/186,047, filed on May 7, 2021.

(51) Int. Cl.
*B65B 57/12* (2006.01)
*B65B 11/04* (2006.01)
*B65B 57/04* (2006.01)
*B65B 11/00* (2006.01)

(52) U.S. Cl.
CPC ............ *B65B 57/04* (2013.01); *B65B 11/045* (2013.01); *B65B 57/12* (2013.01); *B65B 2011/002* (2013.01); *B65B 2210/04* (2013.01)

(58) Field of Classification Search
USPC .............................................. 53/64
See application file for complete search history.

(56) References Cited

U.S. PATENT DOCUMENTS

| 8,001,745 | B2 | 8/2011 | Carter et al. |
| 10,696,436 | B2 | 6/2020 | Ragsdale |
| 11,667,416 | B2* | 6/2023 | Lancaster, III ......... B65B 57/12 53/461 |
| 2009/0293425 | A1 | 12/2009 | Carter et al. |

(Continued)

OTHER PUBLICATIONS

International Preliminary Report on Patentability for PCT/US2022/028041, dated Nov. 16, 2023.

(Continued)

*Primary Examiner* — Chinyere J Rushing-Tucker
(74) *Attorney, Agent, or Firm* — Barnes & Thornburg LLP

(57) ABSTRACT

A system includes a wrapping machine for dispensing film to wrap a load disposed on a pallet, a plurality of sensors configured to detect operation of the machine, and a controller operably and communicatively connected with the sensors. The controller is configured to establish desired values of operating parameters of the machine, the parameters including a wrap pattern, weight of the film, a number of revolutions, a percent of stretch of the film, and a tension of film, during operation of the machine, monitor actual values of the operating parameters using data from the sensors, and in response to a difference between the desired values and the actual values being greater than a threshold, issue a command to adjust operation of the machine such that the difference is less than the threshold.

24 Claims, 9 Drawing Sheets

(56) References Cited

U.S. PATENT DOCUMENTS

| | | | |
|---|---|---|---|
| 2012/0102887 A1* | 5/2012 | Lancaster, III | ....... B65B 11/025 |
| | | | 73/788 |
| 2016/0096645 A1 | 4/2016 | Lancaster, III et al. | |
| 2017/0088301 A1 | 3/2017 | Riemenschneider, III et al. | |
| 2018/0257802 A1* | 9/2018 | Resch | ..................... B65B 57/02 |
| 2018/0273218 A1* | 9/2018 | Lancaster, III | ......... B65B 57/14 |
| 2020/0377250 A1* | 12/2020 | Lancaster, III | ....... B65B 11/006 |
| 2021/0086927 A1* | 3/2021 | Lancaster, III | ......... B65B 57/08 |

OTHER PUBLICATIONS

International Search Report for PCT/US2022/028041, dated Aug. 10, 2022.

\* cited by examiner

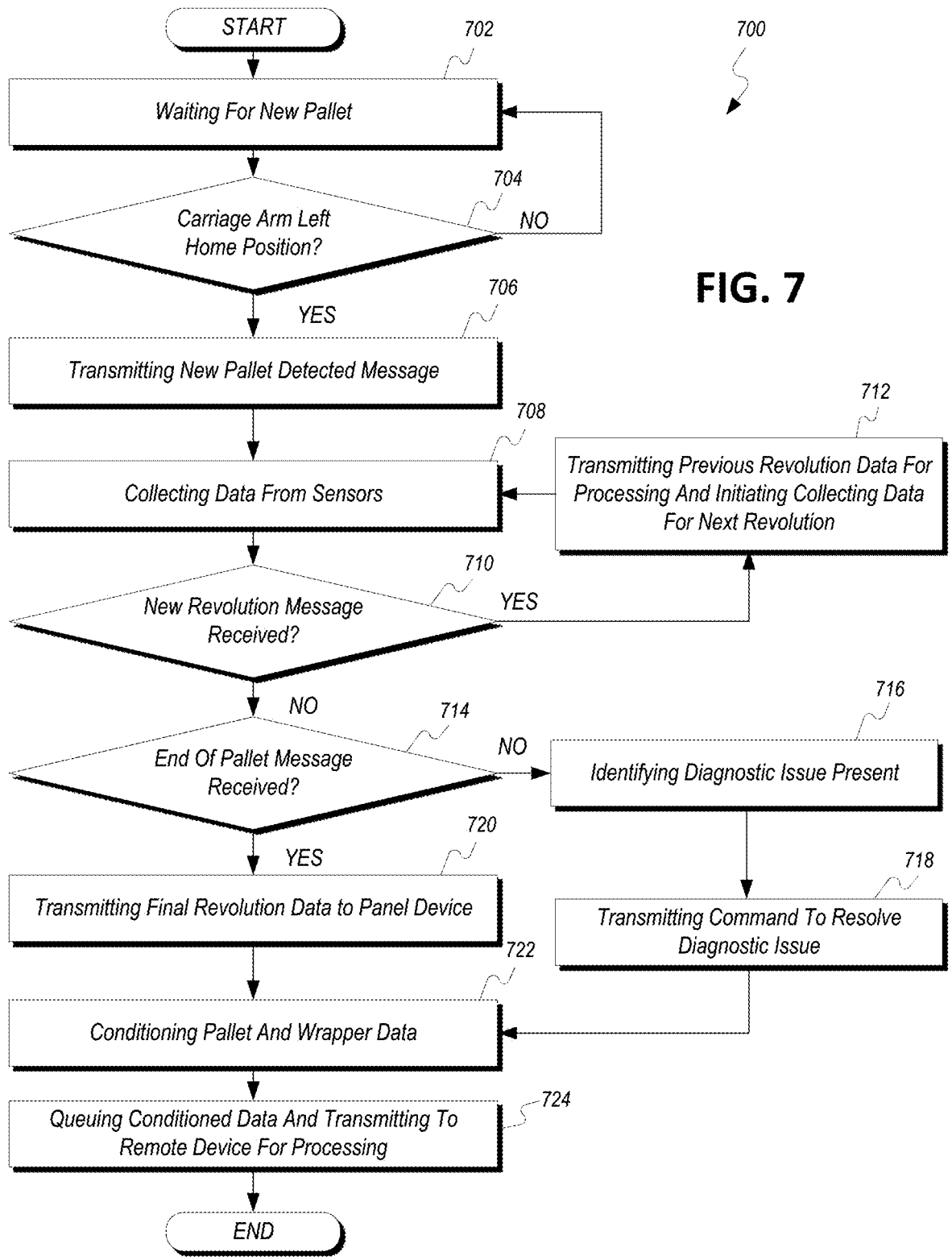

INTELLIGENT SYSTEMS FOR OPTIMIZING STRETCH WRAPPER OPERATION AND STRETCH FILM USAGE

CROSS-REFERENCE TO RELATED APPLICATION

This application claims benefit of priority to U.S. Provisional Application No. 63/186,047, filed May 7, 2021, the disclosure of which is hereby incorporated in its entirety by reference herein.

TECHNICAL FIELD

The present disclosure generally relates to optimizing operation of a stretch wrapper based on a usage profile, age and condition of the wrapper, properties of stretch film and pallet load parameters.

BACKGROUND

Stretch film, stretch wrap film, or stretch wrap comprise of a highly stretchable plastic film that is wrapped around loads with the elastic recovery keeping the loads tightly bound. Stretch films may be used for overwrapping packaged products or palletized loads. Stretch wrapping equipment or stretch wrapping machine may include one or more vertical or horizontal rolls of stretch film positioned adjacent to the rotating pallet load and may wrap stretch film around an item such as a user's product or a palletized load.

SUMMARY

A system includes a wrapping machine for dispensing film to wrap a load disposed on a pallet, a plurality of sensors configured to detect operation of the machine, and a controller operably and communicatively connected with the sensors. The controller is configured to establish desired values of operating parameters of the machine, the parameters including a wrap pattern, weight of the film, a number of revolutions, a percent of stretch of the film, and a tension of film, during operation of the machine, monitor actual values of the operating parameters using data from the sensors, and in response to a difference between the desired values and the actual values being greater than a threshold, issue a command to adjust operation of the machine such that the difference is less than the threshold.

A method includes establishing, by a controller, desired values of operating parameters of a wrapping machine for dispensing film, the parameters including a wrap pattern applied by the wrapping machine, weight of the film, a number of revolutions, and a percent of stretch, during operation of the machine, monitoring actual values of the operating parameters using data from a plurality of sensors configured to detect operation of the machine, and in response to a difference between one of the desired values and the corresponding one of the actual values being greater than a threshold, issuing a command to adjust operation of the machine such that the difference is less than the threshold.

A system includes a wrapping machine for dispensing film to wrap a product disposed on a pallet, the machine including a movable arm and a rotating table, and the pallet and the product being disposed on the rotating table during a wrapping operation. The system includes a plurality of sensors disposed external to the machine and configured to detect operation of the machine, and a controller operably and communicatively connected with the sensors and configured to, detect a value of a parameter indicative of the load and apply a wrap pattern based on the value.

BRIEF DESCRIPTION OF THE DRAWINGS

The detailed description particularly refers to the following figures, in which:

FIG. 7 is a block diagram illustrating an exemplary process flow for monitoring and controlling stretch film usage;

DETAILED DESCRIPTION

Figure 1:
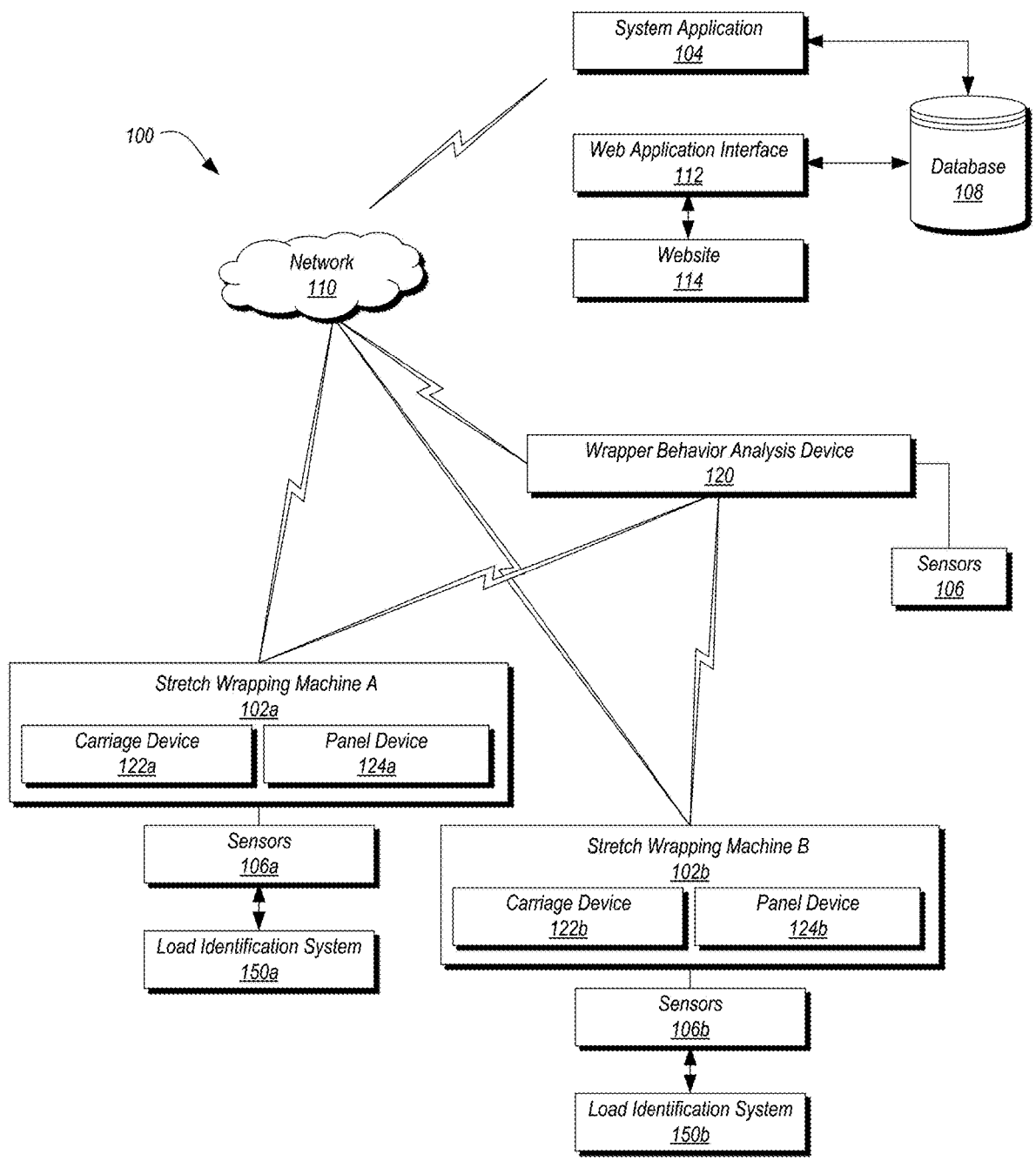
FIG. 1 is a block diagram illustrating an intelligent system for optimizing stretch film wrapper operation and stretch film usage.

Setting and maintaining consistent operating standards across a variety of the stretch film wrapping machines traditionally requires considerable human input and is, therefore, challenging to implement. This task is further complicated given a constantly changing industrial environment, electrical noise or interference, a physical wear and tear impact on the wrapping machine components, limited access to communication frequencies, age, and operating condition of a given machine.

The system of the present disclosure provides intelligent monitoring of pallet wrapping operation to evaluate a load carried by the pallet and to apply a wrap pattern to the load. The intelligent pallet monitoring and film usage system of the present disclosure remedies the shortcomings of traditional monitoring system that rely on human operator input, in that the intelligent pallet monitoring and film usage system receives information indicative of pallet and/or load change consistently or accurately and without having to rely on regular human input. Based on the received data indicative of operation of a given wrapper, the intelligent pallet monitoring and film usage system adapts operation of the wrapper in a precise manner resulting in metrics that are reflective of the real state of the pallet and one or more health scores derived from those metrics to be useful and applicable to the pallet.

The intelligent pallet monitoring and film usage system of the present disclosure applies machine learning and artificial intelligence techniques to monitoring operation and performance of the stretch wrapping machines to detect and analyze unique operating behavior of each wrapping machine. Put another way, the intelligent pallet monitoring and film usage system applies machine learning to monitor operating parameters of a stretch wrapping machine and recommend improvements and diagnostics precisely tailored to the wrapper while accounting for wear and tear and aging of that particular wrapper The intelligent pallet monitoring and film usage system is configured to apply operating parameter algorithms consistently across a variety of machine types.

A wrapper behavior analysis (WBAU) device may be an edge-AI device configured to observe operation of a wrapper and/or receive data indicative of operation of the wrapper. The wrapper behavior analysis device performs advanced computations, e.g., using sensor data or other indicators of wrapper operation, whether observed directly or indirectly, to determine an operating profile of each wrapper. The wrapper behavior analysis device is configured to, based on the determined operating profile of the wrapper considered alone or in combination with operating profiles of other wrappers at a same or different manufacturing or packaging facility, adapt operating parameters of the wrapping machine (or wrapper) to an optimal performance corresponding to an age and/or condition of the wrapper.

The wrapper behavior analysis device may be disposed on-site thereby avoiding having to transmit data to a remote location or device, e.g., a cloud, and reducing on-site network latencies. Additionally or alternatively, the wrapper behavior analysis device may be configured to conduct at least a portion of computations on a remote device. On-site operation may improve performance and timeliness of inferences derived and alerts issued by the wrapper behavior analysis device based on the collected data. On-site implementations of the wrapper behavior analysis device may be immune to network outages connecting the wrapper behavior analysis device to the remote data computation and processing device, such as a cloud.

An optimal combination for one or more machine settings and a wrap pattern is obtained based on the "wrapper profile"/behavior (which typically depends on machine condition, age, type, and other factors) gathered from an analytics artificial intelligence (AI) and/or machine learning (ML) device (WBAU), load parameters obtained using one or more sensors, and pallet identification system, the characteristics of the film used on the wrapper and targeted containment by a user based on pallet load performance required.

Referring now to FIG. 1, an intelligent monitoring and material usage tracking system 100 includes one or more stretch wrapping machines 102 whether located at a same or different industrial facilities or other geographic locations. Each of the machines 102 may be communicatively coupled, via a network 110, to a system application 104. The network 110 may be embodied as any type of network capable of communicatively connecting the stretch wrapping machine 102 and the system application 104, such as a cloud network, an Ethernet-based network, etc. Accordingly, the network 110 may be established through a series of links/interconnects, switches, routers, and other network devices which are capable of connecting the stretch wrapping machine 102 and the system application 104 of the network 110.

The intelligent monitoring and materials usage standards tracking system 100 may comprise a system that monitors and controls operation of the stretch wrapping machine 102. The system application 104 may be in communication with one or more sensors 106 disposed directly on, or proximate to, the stretch wrapping machine 102 and may be configured to establish and maintain optimal stretch film usage parameters for each palletized load wrapped by the stretch wrapping machine 102. For example, the system application 104 may establish and maintain optimal stretch film usage parameters to support minimizing a possibility of damage to either the pallet or the load, while ensuring that only a minimum amount of stretch film is used. The usage parameters monitored by the system application 104 may include, but are not limited to, monitoring wrap patterns, e.g., top/going up, going down, and bottom counts, monitoring amount of stretch film applied to the palletized load, e.g., a number of ounces and/or revolutions of film applied, percentage stretch of the film, and desired and actual tension of the stretch film.

The intelligent monitoring and materials usage standards tracking system 100 includes one or more wrapper behavior analysis devices 120 connected to one or more sensors 106. The wrapper behavior analysis devices 120 may include edge devices and may be configured to perform computational analysis to identify patterns of operation of the stretch wrapping machines 102. Put another way, the intelligent monitoring and materials usage standards tracking system 100 may include one or more edge processors or other computational devices communicatively connected to one or more wired or wireless sensors and a panel device and/or carriage device using a mesh network and may rely on low power, wide area (LPWA) networking protocol that facilitates long range (e.g., LoRa and/or 900 MHz) low power communication, ZigBee mesh or other network types using same or different frequency ranges.

As described below in further detail (see, e.g., FIGS. 3 and 4), the stretch wrapping machine 102 may include a carriage device 122 and a panel device 124. The carriage device 122 may be configured to monitor and control operation of several movable or fixed components of the machine 102, such as, but not limited to, one or more rollers, rotary arms, tracks, conveyors, and towers. The panel device 124 may be configured to receive, process, and analyze user input to control the stretch wrapping machine 102, display notifications or alerts indicating a status, condition, or operating parameter value of the machine 102, and perform other monitoring or controlling operations establish and maintain desired operation of the machine 102. The carriage device 122 and the panel device 124 may be communicatively coupled with one another and may operate in conjunction and/or overlap in functionality. As another example, the carriage device 122 and the panel device 124 may perform one or more operations or functions independently, such as by communicating directly with other components of the system 100.

The carriage device 122 and the panel device 124 are communicatively coupled to at least one of a plurality of sensors 106. The sensors 106 comprise a variety of sources of data related to establishing a status of operation of the stretch wrapping machine 102. At least one of the sensors 106 transmits data to the carriage device 122. Additionally or alternatively, one of the sensors 106 transmits data to the panel device 124. The sensors 106 communicating with the carriage device 122 and the panel device 124, may, but need not, be a same sensor.

One or more of the sensors 106 may be installed within or proximate to the stretch wrapping machine 102 and may be configured to capture data indicative of operating conditions of the stretch wrapping machine 102. The sensors 106 may be embodied as any type of device capable of performing the functions described herein, including, but not limited to, a sensor (e.g., a motion sensor, a location sensor, a positioning sensor, etc.) and a beacon providing operating status (e.g., reporting remotely, detected by a reader, etc.).

In some instances, information gathering by way of sensors 106 external to, and communicatively independent from, the stretch wrapping machine 102 may minimize downtime across different types of wrapping machines. The sensors 106 configured to operate by having a consistent install process for widest possible types of wrapping machines, provide additional feedback not otherwise available from one or more machine types, as well as, standardizes data collection and processing across different machine types.

Once received, the carriage device 122 and/or the panel device 124 may process the sensor data (e.g., filter, clean, harmonize, organize, prioritize, arrange in a hierarchy, or categorize according to one or more attributes) prior to transmitting the data to the system application 104. In other examples, the carriage device 122 and/or the panel device 124 transmit, to the system application 104, at least a portion of the data captured by the sensors 106 in raw or unprocessed form. In still other examples, the carriage device 122 minimally processes the sensor data, such as to accommodate one or more data transmission protocols, prior to sending the data to the system application 104 for further processing. Additionally or alternatively, one or more wrapper behavior analysis devices 120 may be edge device configured to process and analyze data indicating operating parameters and other metrics of wrapper operation.

The system application 104 may be configured to store all or a portion of the received sensor data on a database 108. In an example, the system application 104 may perform analytics processes based on, or using, the received sensor data prior to storing the data in the database 108. The results of the analysis output by the system application 104 may then be used for various purposes. For instance, the system application 104 may transmit the results of the analytics processes to the stretch wrapping machine 102 for display by the panel device 124. In other examples, either processed or raw sensor data may be accessible to the user on a performance tracking website 114, e.g., via a web application interface 112. In one example, the website 114 may permit a user to see additional pallet information on the website, historical information, configuration/settings information and setup options for one or more lines and locations of the wrapping machines 102. The website 114 may further provide for setting, storing, and updating user preferences and management, customized AI/ML metrics, parameters, and values, and customization of analytics reporting, health score metrics and diagnostic or troubleshooting options.

In other examples, data may be transmitted to the edge device(s), to run AI/ML algorithms to provide custom insights, suggested fixes for diagnostic issues, alerts, wrapper health and performance metrics and so on. In still other examples, data processed by the edge devices may be used to calculate health score, production efficiency score and sustainability score.

One or more of the system application 104, the database 108, and the web application interface 112 may be embodied as, or operate in conjunction with, any type of compute device capable of performing functions, including, but not limited to, a compute device, a storage device, a server (e.g., stand-alone, rack-mounted, blade, etc.), a sled (e.g., a compute sled, an accelerator sled, a storage sled, etc.), an enhanced network interface controller (NIC), a network appliance (e.g., physical or virtual), a router, a web appliance, a distributed computing system, a processor-based system, and/or a multiprocessor system.

While not so limited, the sensors 106 may include one or more of a light detection and ranging (LIDAR) sensor, a proximity collar sensor, a plurality of photo-eye sensors, and a photo-eye tree sensor. In one example, the LIDAR sensor may be configured to monitor the position of the carriage (arm) of the wrapper 102 around the pallet. In some case, the arm moves up and down while the pallet rotates on a turn table). This data may be indicative of behavior of the stretch film as the film is being applied around the pallet. In some instances, the LIDAR sensor may be configured to detect one of the positional data, climb rates, speed/acceleration, breaks or faults occurring as the carriage travels around the pallet. Additionally or alternatively, example sensors include proximity sensors, accelerometers, near field communication (NFC) sensors, radio frequency (RF) tags, Bluetooth Low Energy (BLE) sensors that may be mounted on the wrapper. Data from the sensors may be used to calculate a position of the carriage at various times.

The data captured by the LIDAR sensor may be processed and analyzed to discern a "fingerprint" of the machine's unique behavior. As such, the data received from the LIDAR sensor may be used to set a custom desired operating parameter values and to maintain operation of stretch wrapping machine 102 according to the custom desired operating parameter. Such customization and capture of the unique operating parameter values may be further adjusted according to normal wear-and-tear and ageing of the particular stretch wrapping machine 102. This also enables applying algorithms consistently across machine types.

The proximity-collar sensor may be mounted on a pre-stretch roller of the stretch wrapping machine 102 and may be configured to measure a number of revolutions of film dispensed during a given wrapping operation.

A plurality of photo-eye sensors may be configured to detect an amount of film remaining on a dispensing roller. In an example, the photo-eye sensors may be mounted under a stretch film dispensing roller and may be configured to determine whether the roll of film is full, partially full, or empty and/or detect if a new roll of film has been installed. We could use other types of proximity sensors or load cells (weight sensors) too for film quantity identification.

A photo-eye tree sensor may be configured to determine dimensions of the pallet to help determine a wrap pattern suitable for the pallet. A pallet-eye sensor may be configured to collect data to identify a product of the load and/or to identify irregular loads, such as loads that deviate in one or more metrics from one or more predefined standard load metrics. The pallet-eye sensor may be configured to identify one or more dimensions of the pallet, weight of the pallet and/or the load, a product name and/or type, and so on. Additionally or alternatively, data indicative of wrapper operation may be obtained from the palletizer, fork lifts, pallet labeler systems, scanning/reading the label on the pallet, a camera vision system or using lasers for pallet measurements.

Figure 2:
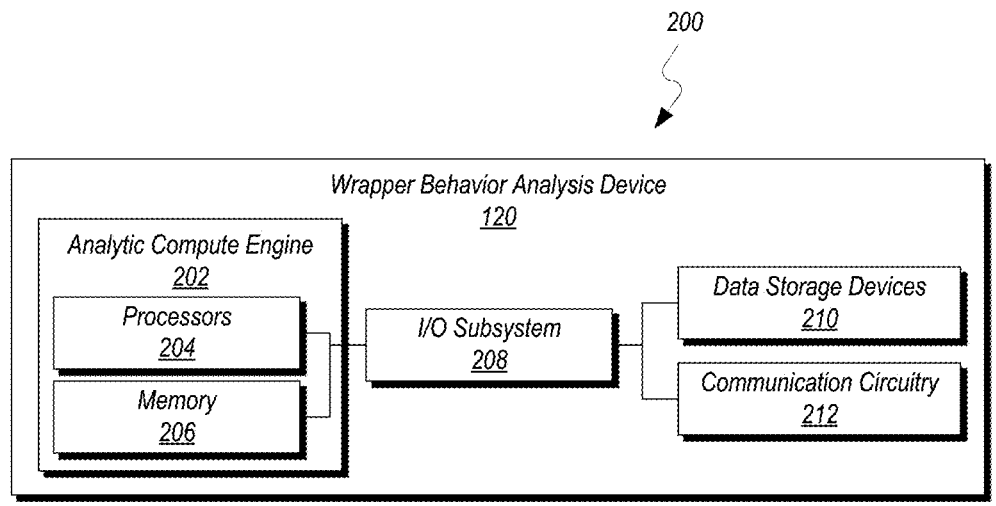
FIG. 2 is a block diagram illustrating an example wrapper behavior analysis edge device of the system of FIG. 1.

FIG. 2 illustrates an exemplary implementation 200 of the wrapper behavior analysis device 120. While the illustrated implementation 200 describes only the wrapper behavior analysis device 120, in other examples, the carriage device 122 and the panel device 124 may be embodied to include similar components configured to perform similar operations to those described, with respect to the wrapper behavior analysis device 120. The carriage device 122 includes an analytic compute engine 202, an I/O subsystem 208, one or more data storage devices 210, and communication circuitry 212. It will be appreciated that the wrapper behavior analysis device 120 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component.

The analytic compute engine 202 may be embodied as any type of device or collection of devices capable of performing the described various compute functions. In some embodiments, the analytic compute engine 202 may be embodied as a single device, such as an integrated circuit, an embedded system, a field-programmable gate array (FPGA), a system-on-a-chip (SoC), an application-specific integrated circuit (ASIC), reconfigurable hardware or hardware circuitry, or other specialized hardware to facilitate performance of the functions described herein. In some embodiments, the analytic compute engine 202 may include, or may be embodied as, one or more processors 204 (i.e., one or more central processing units (CPUs)) and memory 206.

The processor(s) 204 may be embodied as any type of processor capable of performing the described functions. For example, the processor(s) 204 may be embodied as one or more single-core processors, one or more multi-core processors, a digital signal processor, a microcontroller, or other processor or processing/controlling circuit(s). In some embodiments, the processor(s) 204 may be embodied as, include, or otherwise be coupled to an FPGA, an ASIC, reconfigurable hardware or hardware circuitry, or other specialized hardware to facilitate performance of the described functions.

The memory 206 may be embodied as any type of volatile (e.g., dynamic random access memory (DRAM), etc.) or non-volatile memory or data storage capable of performing the described functions. It will be appreciated that the memory 206 may include main memory (i.e., a primary memory) and/or cache memory (i.e., memory that can be accessed more quickly than the main memory). Volatile memory may be a storage medium that requires power to maintain the state of data stored by the medium. Non-limiting examples of volatile memory may include various types of random access memory (RAM), such as DRAM or static random access memory (SRAM).

The analytic compute engine 202 is communicatively coupled to other components of the compute device 102 via the I/O subsystem 208, which may be embodied as circuitry and/or components to facilitate input/output operations with the processor 204, the memory 206, and other components of the compute device 102. For example, the I/O subsystem 208 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 208 may form a portion of an SoC and be incorporated, along with the analytic compute engine 202 (e.g., the processor 204, the memory 206, etc.) and/or other components of the compute device 102, on a single integrated circuit chip.

The one or more data storage devices 210 may be embodied as any type of storage device(s) configured for short-term or long-term storage of data, such as, for example, memory devices and circuits, memory cards, hard disk drives, solid-state drives, or other data storage devices. Each data storage device 210 may include a system partition that stores data and firmware code for the data storage device 210. Each data storage device 210 may also include an operating system partition that stores data files and executables for an operating system.

The communication circuitry 212 may be embodied as any communication circuit, device, or collection thereof, capable of enabling communications between the wrapper behavior analysis device 120 and other computing devices, such as the system application 104, the carriage device 122, the panel device 124, etc., as well as any network communication enabling devices, such as a gateway, an access point, other network switches/routers, etc., to allow ingress/egress of network traffic. Accordingly, the communication circuitry 212 may be configured to use any one or more communication technologies (e.g., wireless or wired communication technologies) and associated protocols (e.g., Ethernet, Bluetooth®, Wi-Fi®, WiMAX, LTE, 5G, etc.) to effect such communication.

It should be appreciated that, in some embodiments, the communication circuitry 212 may include specialized circuitry, hardware, or combination thereof to perform pipeline logic (e.g., hardware algorithms) for performing the functions described herein, including processing network packets (e.g., parse received network packets, determine destination computing devices for each received network packets, forward the network packets to a particular buffer queue of a respective host buffer of the wrapper behavior analysis device 120, etc.), performing computational functions, etc.

In some embodiments, performance of one or more of the functions of the described communication circuitry 212 may be performed by specialized circuitry, hardware, or combination thereof of the communication circuitry 212, which may be embodied as an SoC or otherwise form a portion of a SoC of the wrapper behavior analysis device 120 (e.g., incorporated on a single integrated circuit chip along with a processor 204, the memory 206, and/or other components of the wrapper behavior analysis device 120). Alternatively, the specialized circuitry, hardware, or combination thereof may be embodied as one or more discrete processing units of the wrapper behavior analysis device 120, each of which may be capable of performing one or more of the described functions.

Figure 3:
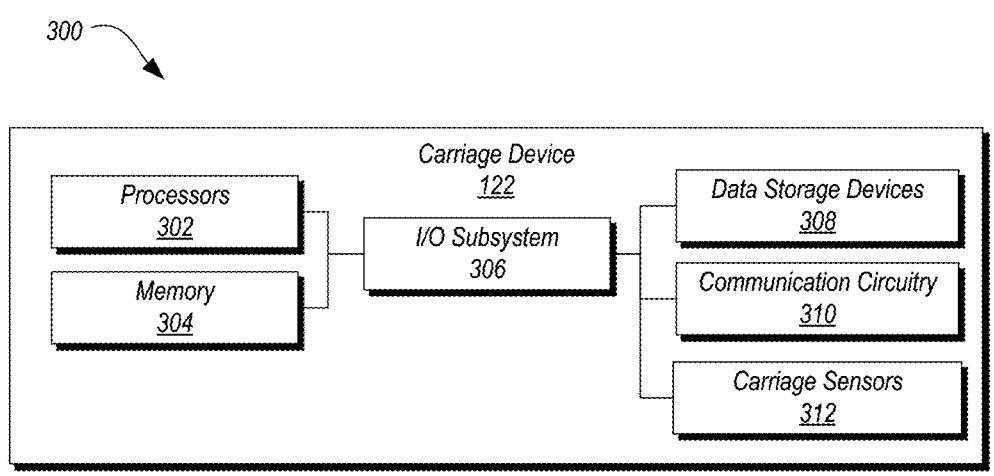
FIG. 3 is a block diagram illustrating an example carriage device of the system of FIG. 1.

FIG. 3 illustrates an example carriage device 122. Some wrappers may be equipped with the carriage device 122. The carriage device 122 may include one or more processors 302, memory 304, an I/O subsystem 306, one or more data storage device 308, communication circuitry 310, and one or more carriage sensors 312. The carriage device 122 may be configured to process signals, data, or other information detected and output to the carriage device 122 by the one or more carriage sensors 312. Additionally or alternatively, the carriage device 122 may be configured to transmit processed or raw data of the one or more carriage sensors 312 to an on-site processing device and/or a remote processing device, such as, but not limited to, a cloud, an edge device, and so on. In wrappers where the carriage device 122 is not present (e.g., wrappers not equipped with the carriage device 122), a panel (and/or edge) device may be mounted and may collect data from one or more wireless sensors. Certain types of sensors, such as LIDAR sensors, may be replaced by other proximity sensors or BLE beacons, NFC tags, and so on, in carriage-less wrappers.

Figure 4:
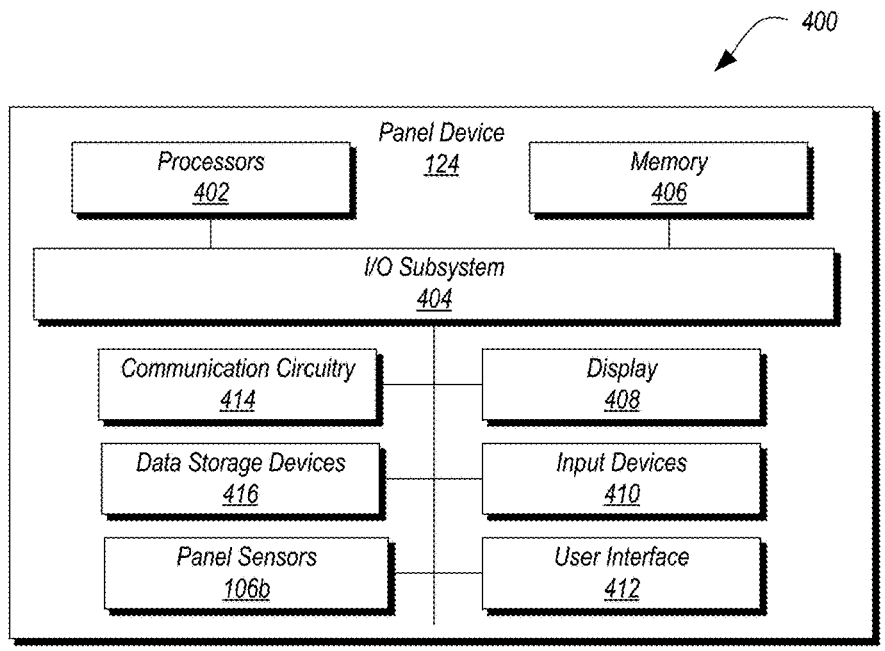
FIG. 4 is a block diagram illustrating an example panel device of the system of FIG. 1.

Referring now to FIG. 4, the illustrative panel device 124 is shown and it includes a processor 402, an I/O subsystem 404, a memory 406, a display 408, input device(s) 410, a user interface 412, a communication circuit 414, and a data storage 416. Of course, in other embodiments, the panel device 124 may include alternative or additional components, such as those commonly found in a server, router, switch, or other network device. Additionally, in some embodiments, one or more of the illustrative components may be incorporated in, or otherwise form a portion of, another component. For example, the memory 406, or portions thereof, may be incorporated in one or more processors 402.

The processor 402 may be embodied as any type of processor capable of performing the described functions. The processor 402 may be embodied as a single or multi-core processor(s), digital signal processor, microcontroller, or other processor or processing/controlling circuit. The memory 406 may be embodied as any type of volatile or non-volatile memory or data storage capable of performing the functions described herein. In operation, the memory 406 may store various data and software used during operation of the panel device 124, such as operating systems, applications, programs, libraries, and drivers.

The memory 406 is communicatively coupled to the processor 402 via the I/O subsystem 404, which may be embodied as circuitry and/or components to facilitate input/output operations with the processor 402, the memory 406, and other components of the panel device 124. For example, the I/O subsystem 404 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 404 may form a portion of a system-on-a-chip (SoC) and be incorporated, along with the processors 402, the memory 406, and other components of the panel device 124, on a single integrated circuit chip.

The display 408 may be embodied as any type of display capable of displaying digital information to a user such as a liquid crystal display (LCD), a light emitting diode (LED), a plasma display, a cathode ray tube (CRT), or other type of display device. As described below, the display 408 may be used to display a graphical user interface or other information to the user of the panel device 124. Additionally, in some embodiments, the panel device 124 may include a touch screen coupled to or incorporated in the display 408. The touch screen may be used to receive user tactile input.

The communication circuit 414 may be embodied as any communication circuit, device, or collection thereof, capable of enabling communications between the panel device 124 and the wrapper behavior analysis device 120 via the network 110. To do so, the communication circuit 414 may be configured to use any one or more communication technology and associated protocols (e.g., Ethernet, Bluetooth®, Wi-Fi®, WiMAX, etc.) to effect such communication.

The data storage 416 may be embodied as any type of device or devices configured for short-term or long-term storage of data such as, for example, memory devices and circuits, memory cards, hard disk drives, solid-state drives, or other data storage devices. The data storage 416 and/or the memory 406 may store various other data useful during the operation of the panel device 124.

Figure 5:
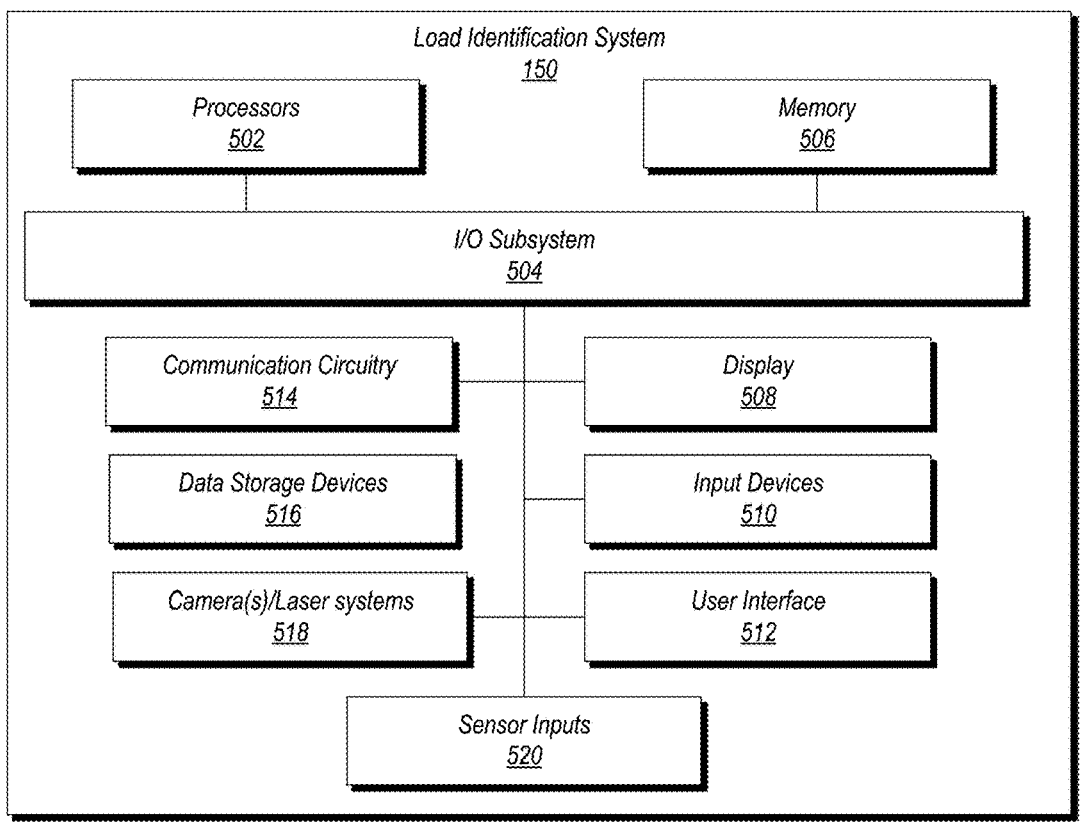
FIG. 5 is a block diagram illustrating an example load identification system of the system of FIG. 1.

FIG. 5 illustrates an example implementation of a load identification system 150 of FIG. 1. The load identification system 150 includes a processor 502, an I/O subsystem 504, a memory 506, a display 508, input device(s) 510, a user interface 512, a communication circuit 514, and a data storage 516. Of course, in other embodiments, the load identification system 150 may include alternative or additional components, such as those commonly found in a server, router, switch, or other network device. Additionally, in some embodiments, one or more of the illustrative components may be incorporated in, or otherwise form a portion of, another component. For example, the memory 506, or portions thereof, may be incorporated in one or more processors 502.

The processor 502 may be embodied as any type of processor capable of performing the described functions. The processor 502 may be embodied as a single or multi-core processor(s), digital signal processor, microcontroller, or other processor or processing/controlling circuit. The memory 506 may be embodied as any type of volatile or non-volatile memory or data storage capable of performing the functions described herein. In operation, the memory 506 may store various data and software used during operation of the load identification system 150, such as operating systems, applications, programs, libraries, and drivers.

The memory 506 is communicatively coupled to the processor 502 via the I/O subsystem 504, which may be embodied as circuitry and/or components to facilitate input/output operations with the processor 502, the memory 506, and other components of the load identification system 150. For example, the I/O subsystem 504 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 504 may form a portion of an SoC and be incorporated, along with the processors 502, the memory 506, and other components of the load identification system 150, on a single integrated circuit chip.

The display 508 may be embodied as any type of display capable of displaying digital information to a user such as a liquid crystal display (LCD), a light emitting diode (LED), a plasma display, a cathode ray tube (CRT), or other type of display device. As described below, the display 508 may be used to display a graphical user interface or other information to the user of the load identification system 150. Additionally, in some embodiments, the load identification system 150 may include a touch screen coupled to or incorporated in the display 508. The touch screen may be used to receive user tactile input.

The communication circuit 514 may be embodied as any communication circuit, device, or collection thereof, capable of enabling communications between the load identification system 150 and the wrapper behavior analysis device 120 directly and/or via the network 110. To do so, the communication circuit 514 may be configured to use any one or more communication technology and associated protocols (e.g., Ethernet, Bluetooth®, Wi-Fi®, WiMAX, etc.) to effect such communication.

The data storage 516 may be embodied as any type of device or devices configured for short-term or long-term storage of data such as, for example, memory devices and circuits, memory cards, hard disk drives, solid-state drives, or other data storage devices. The data storage 516 and/or the memory 506 may store various other data useful during the operation of the load identification system 150.

Figure 6A:
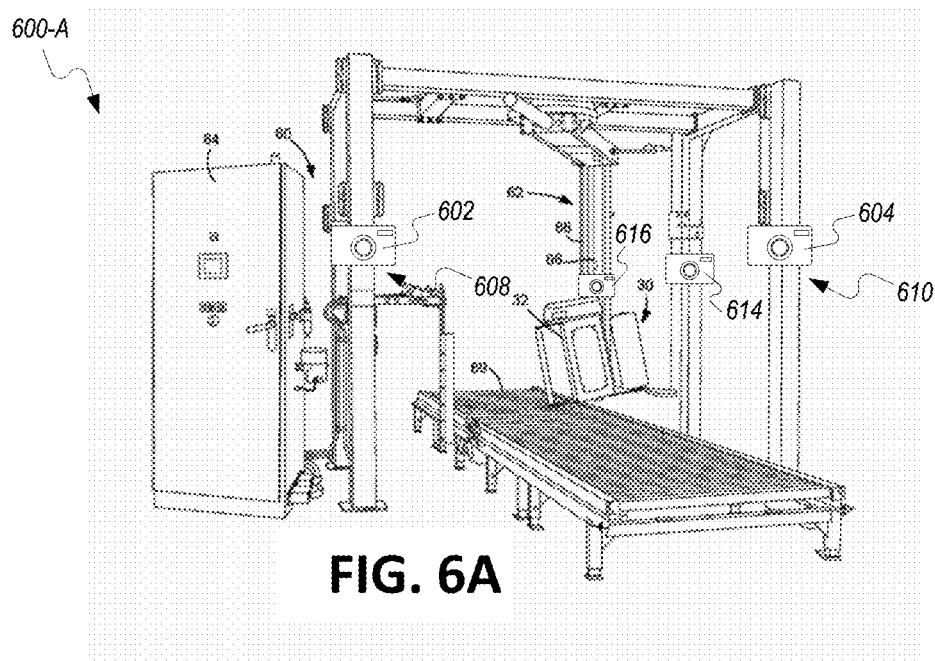
FIGS. 6A and 6B are block diagrams illustrating an example implementation of the load identification system.
Figure 6B:
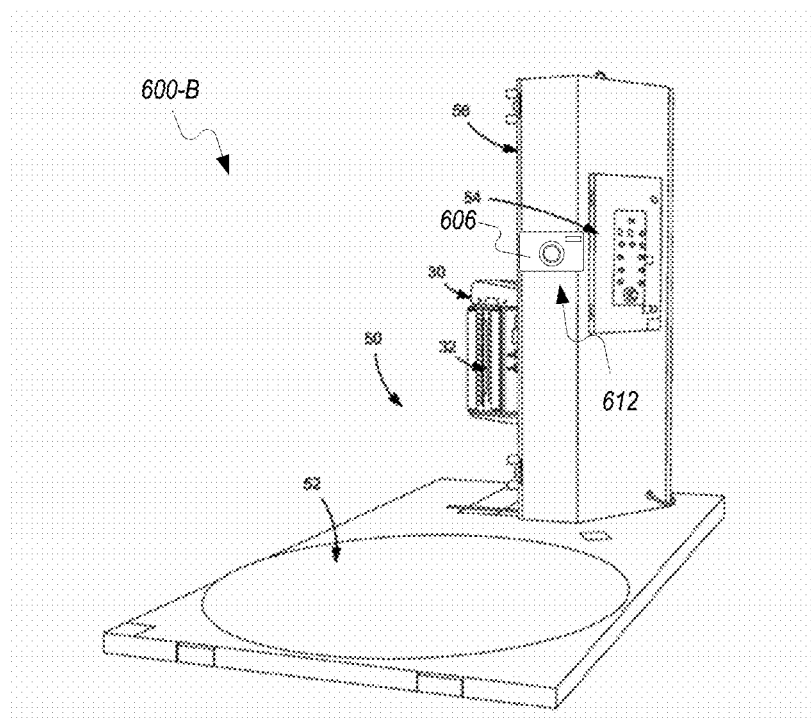

FIGS. 6A and 6B illustrate example implementations 600-A and 600-B, respectively, of the load identification system 150. One or more components 602, 604, 606 of the load identification system 150 may be disposed at one or more positions 608, 610, 612 of the wrapping machines. Of course, other positions of the load identification system 150 are also contemplated. As just one example, one or more of the cameras 602, 604, 606, 614, and 616 may be mounted on the stationary wrapper support/or standalone mounts and may be configured to record dimensions of the pallets and/or dimensions of items on pallets of the incoming loads. Additionally or alternatively, the cameras, e.g., one or more of the cameras 602, 604, 606, 614, and 616, may be mounted on the rotating carriage to calculate the three dimensions (3D) of the load. As still another example, one or more cameras, such as, but not limited to, one or more of the cameras 602, 604, 606, 614, and 616, may be mounted on the rear wrapper support/or standalone mounts, to record the pallet stretch wrapping quality on the outgoing load.

FIG. 7 illustrates an example process flow 700 for intelligent pallet and stretch film usage monitoring. In some embodiments, the process 700 may be executed by one or more of the processors 204, 302, 402, and 502 using one or more modules of the wrapper behavior analysis device 120, the carriage device 122, the panel device 124, and the load identification system 150, respectively. A panel controller, at block 702, waits for a new pallet and, at block 704, detects whether a carriage arm left a predefined home position. If the carriage arm has not left the home position, the panel controller returns to block 702. A carriage arm may pass a home position at the end of each revolution and may stop and dwell at the home position after wrapping of a pallet is complete The panel controller may, at block 706, notify the arm controller each time the carriage arm either passes or stops and dwells at the home position. The arm controller, at block 708, collects data during each revolution, including a minimum and maximum heights observed (e.g., using LIDAR), whether the film roll was empty (e.g., using two photo-eye sensors). Pulse count from the pulse collar on the wrapper's pre-stretch roller. In response to determining at block 710 (e.g., based on a corresponding message from the panel controller) that a new revolution has begun, the arm controller at block 712 transmits data collected for a current revolution to the panel controller. In one example, the panel controller accumulates the revolution data in RAM.

In response to determining at block 714 that a pallet cycle has completed (such as, in response to carriage arm coming to rest the home position), the panel controller transmits at block 720 to the arm controller a message indicating that the pallet is complete. The panel controller at block 722 conditions or otherwise processes sensor data. In one example, the panel controller performs calculations using the accumulated revolution data. The panel controller at block 724 queues the summarized or otherwise conditioned and/or processed pallet data and transmits the data to a remote data processing and analysis device, such as, but not limited to, a cloud. In some instances, the panel controller may delete the pallet data from a local memory.

If the panel controller determines at block 714 that a pallet cycle has not completed, the panel controller at block 716 identifies a diagnostic issue that may be present in the system. At block 718 the panel controller transmits one or more commands and/or instruction messages to resolve the diagnostic issue.

Figures 8A, 8B:
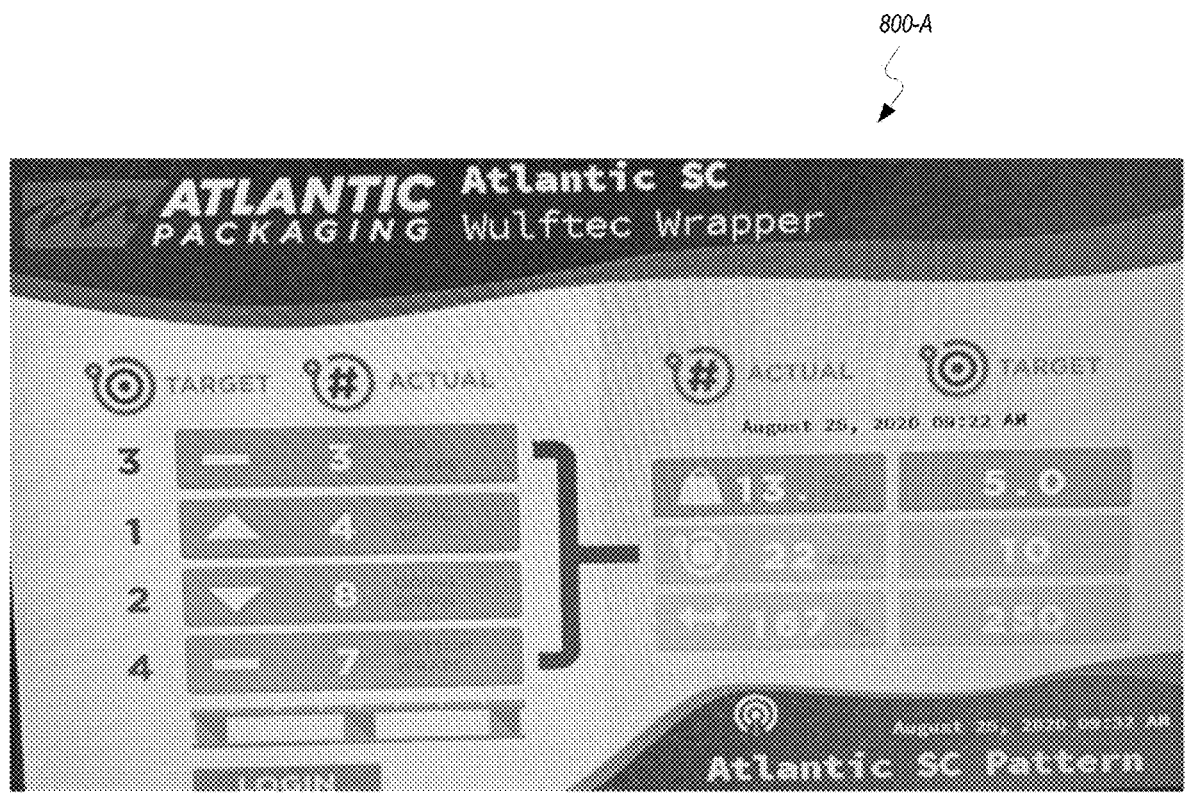
FIG. 8A-8E are block diagrams illustrating example graphical layouts in accordance with the present disclosure.
Figure 8C:
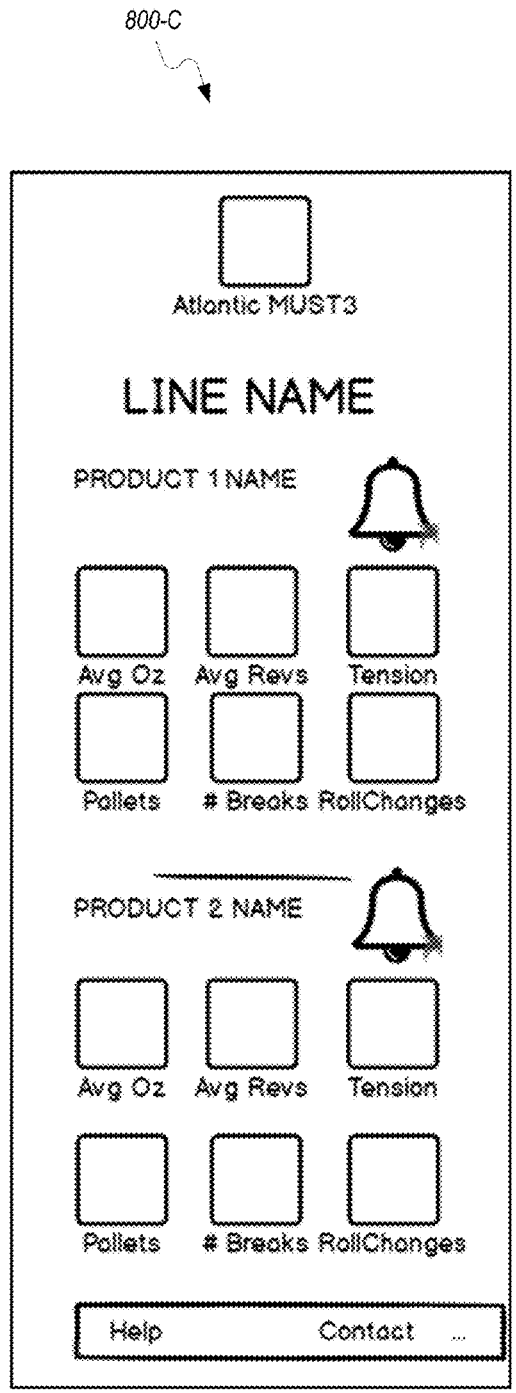
Figure 8D:
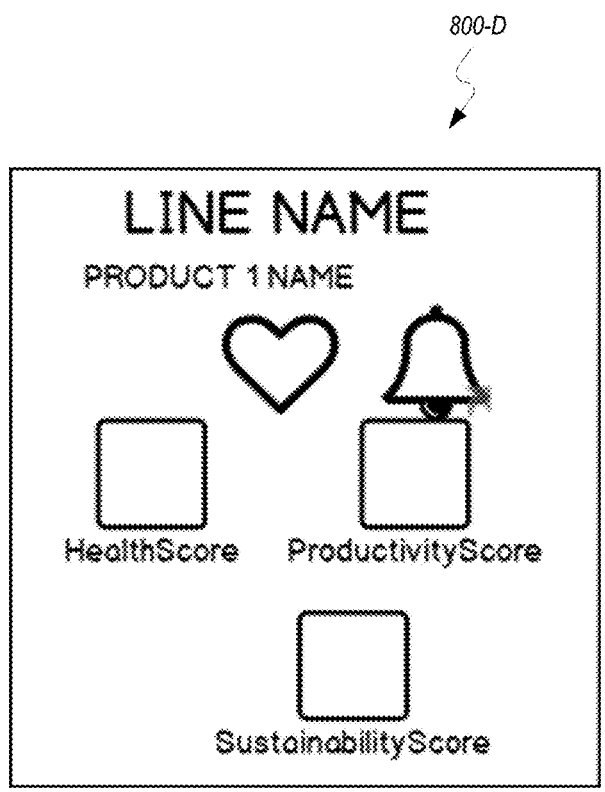

FIG. 8D illustrates an example display 800-D of a health score value and other parameters indicative of wrapper health/performance metrics. Productivity score value calculates the production efficiency of the wrapper and helps optimize the wrapper usage at the facility and run maximum pallets possible. Sustainability score value may be indicative of one or more parameters or metrics for operating the wrapper in an environmentally sustainable manner.

Figure 8E:
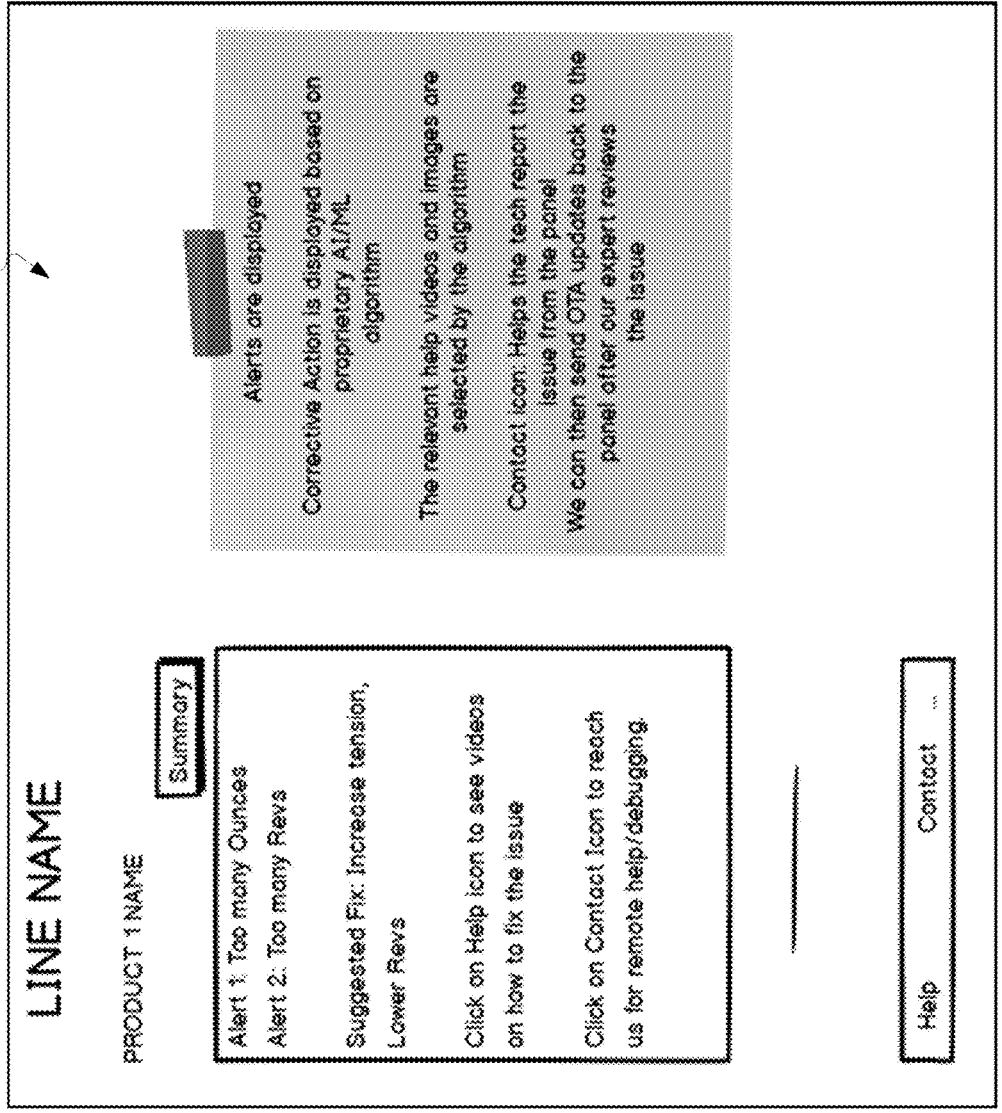

FIGS. 8C and 8E illustrates example display arrangements 800-C and 800-E of a panel device and may include a wrapper 24-hour-operation summary data, problems and proposed, suggested, or executed fixes. In one example, the display arrangements 800-C and 800-E may be accessible via a desktop or a mobile device following authentication, such as an example authentication implementation 800-B illustrated in FIG. 8B, via a QR (quick response) code, or OTP (one-time password). Other identity verification and authorization methods are also contemplated. The panel displays existing faults and PdM (predictive maintenance) messages to help keep the wrapper in an optimal operating condition. Alongside the messages, the technical details to fix the issue are provided by means of additional files or attached documents and/or videos, to help the technicians fix the problems. For example, the system of the present disclosure may be configured to diagnose that one or more breaks occurring in the stretch film may be due to excessive tension, excessive revolutions may be contributing to wastage of the film. The system of the present disclosure may be configured to issue one or more instruction messages to wrapper operators, including but not limited to, messages directing the operator to increase/lower the revs being applied to the pallet.

Figure 9:
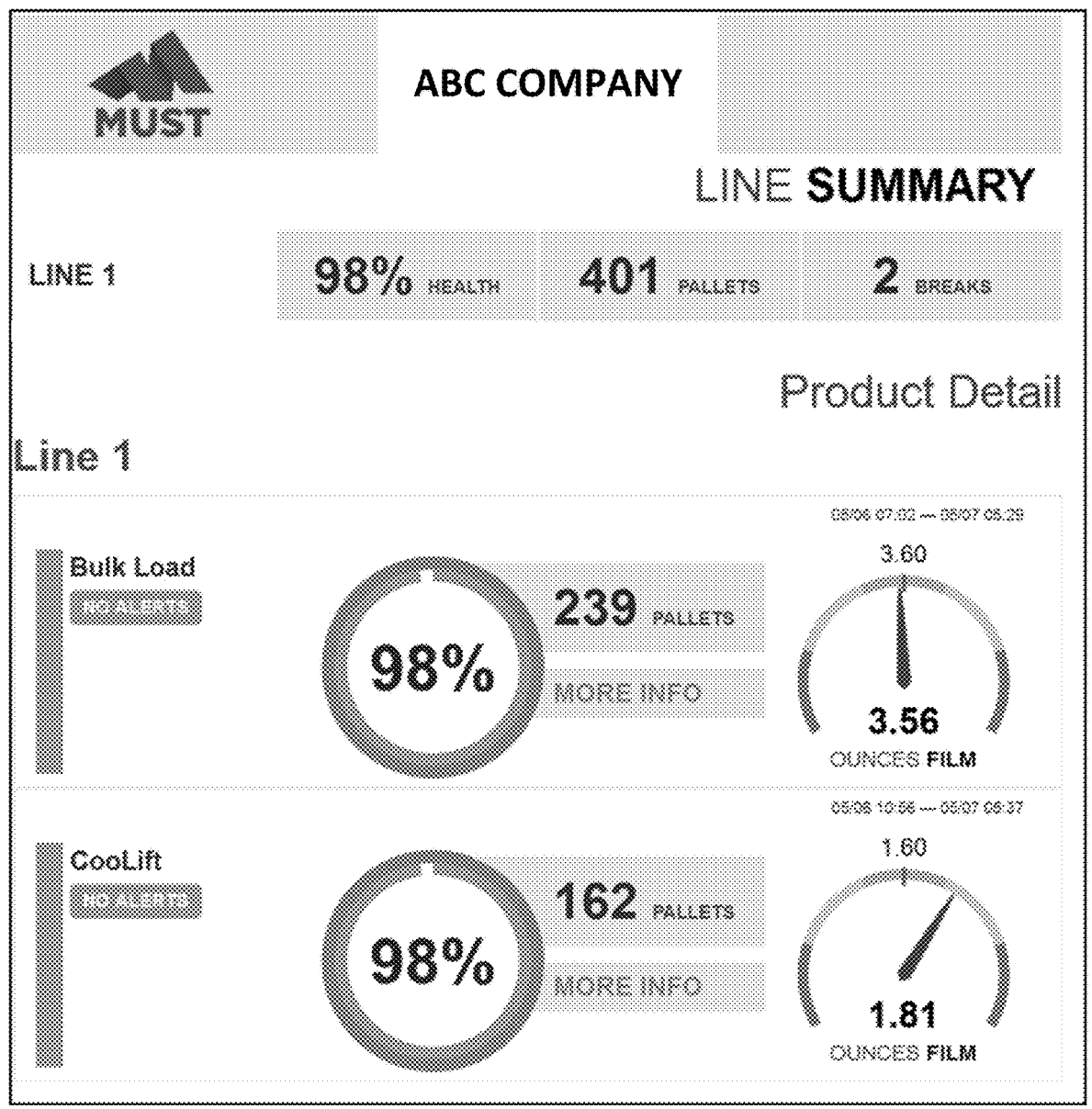
FIG. 9 is an example layout of the alerts/reports presented to a user via an email/mobile app or on a website.

FIG. 9 illustrates an example implementation 900 of a computed health score value display arrangement. The health score value may be indicative of the quality of the pallet wrapping output on the lines and may help identify areas of operation in need of improvement through line settings adjustments or diagnostic and repair of line hardware faults.

While the concepts of the present disclosure are susceptible to various modifications and alternative forms, specific exemplary embodiments are been shown by way of example in the drawings and will be described. It should be understood, however, that there is no intent to limit the concepts of the present disclosure to the particular forms disclosed; on the contrary, the intention is to cover all modifications, equivalents, and alternatives falling within the spirit and scope of the invention as defined by the appended claims.

References in the specification to "one embodiment," "an embodiment," "an illustrative embodiment," etc., indicate that the described embodiment may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

There are a plurality of advantages of the present disclosure arising from the various features of the method, apparatus, and system described herein. It will be noted that alternative embodiments of the method, apparatus, and system of the present disclosure may not include all of the features described yet still benefit from at least some of the advantages of such features. Those of ordinary skill in the art may readily devise their own implementations of the method, apparatus, and system that incorporate one or more of the features of the present invention and fall within the spirit and scope of the present disclosure as defined by the appended claims.

The invention claimed is:

1. A system comprising:
   a wrapping machine for dispensing film to wrap a load disposed on a pallet;
   a plurality of sensors configured to detect operation of the machine; and
   a controller operably and communicatively connected with the sensors and configured to:
     establish desired values of operating parameters of the wrapping machine, the parameters including a wrap pattern, weight of the film, a number of revolutions, a percent of stretch of the film, and a tension of film,
     during operation of the machine, monitor actual values of the operating parameters using data from the sensors, and
     in response to a difference between the desired values and the actual values being greater than a threshold, issue a command to the wrapping machine during operation of the wrapping machine to automatically adjust operation of the wrapping machine such that the difference is less than the threshold,
   wherein the controller is further configured to determine that a first pallet has a first height and a first product type, a second pallet has second height and second product type, wherein the first height is equal to second height, wherein the controller is configured to apply a first wrap pattern to the first pallet and second wrap pattern to the second pallet, wherein the first wrap pattern is different from the second wrap pattern.

2. The system of claim 1, wherein the controller is further configured to determine a value of one or more parameters indicative of the load; and apply the wrap pattern according to the value of the parameter, wherein the parameter is one of height of the load, width of the load, weight of the load, a type of the product, and a name of the product.

3. The system of claim 1, further comprising a camera configured to detect a misaligned load based on a comparison between a structure/configuration of the load on the pallet and a predefined structure/configuration.

4. The system of claim 3, wherein the camera determines that the load is misaligned in response to dimension/structure/configuration of the load being out of range of compared to predefined dimension/structure/configuration.

5. The system of claim 4, wherein, in response to the detecting the misaligned load, the controller is configured to issue a command to adjust operation of the wrapping machine.

6. The system of claim 1, wherein to establish the desired values includes to perform at least one of testing each of the operating parameters of the machine and auditing each of the operating parameters.

7. The system of claim 1, wherein the sensors include at least one of a light detection and ranging (LIDAR) sensor, a proximity collar sensor, a plurality of photo-eye sensors, a photo-eye tree sensor, RF tag, Bluetooth Low Energy (BLE), NFC and proximity sensor.

8. The system of claim 1, wherein the machine comprises a movable arm configured to move about the pallet during a wrapping operation and wherein the sensor is configured to detect a position of the arm with respect to the pallet.

9. The system of claim 8, wherein the arm is further configured to move along a vertical axis relative to the pallet during an up/down wrapping operation and wherein the sensor is further configured to detect a position of the arm along the vertical axis during the up/down wrapping operation.

10. The system of claim 1, wherein to sensor is further configured to monitor travel of the film during application of the film around the pallet.

11. The system of claim 1, wherein the sensor is further configured to detect one of a climb rate of the arm with respect to the pallet, a speed of the arm, and an acceleration of the arm.

12. The system of claim 1, wherein the sensor is further configured to detect a break or fault in the arm during travel of the arm around the pallet and in response to detecting that a proximity collar stopped dispensing film and no pulses received from the sensor.

13. The system of claim 1, wherein the controller is further configured to:
   detect values of parameters indicative of the load, wherein the parameters are height of the load, width of the load, weight of the load, a type of the product, and a name of the product,
   determine the wrap pattern suitable for the load based on the values of parameters indicative of the load, and
   direct the wrapping machine to apply the wrap pattern according to the values of the parameters indicative of the load.

14. The system of claim 1, wherein the controller is configured to issue the command to the wrapping machine during operation of the wrapping machine to automatically adjust operation of the wrapping machine without user input.

15. A system comprising:
   a wrapping machine for dispensing film to wrap a product disposed on a pallet, wherein the machine comprises a movable arm and a rotating table, and wherein the pallet and the product are disposed on the rotating table during a wrapping operation;
   a plurality of sensors disposed external to the machine and configured to detect operation of the machine; and
   a controller operably and communicatively connected with the sensors and configured to:

detect values of parameters indicative of the product, wherein the parameters are height, width, weight, type, and name of the product, determine a wrap pattern suitable for the product based on the values of the parameters indicative of the product, and direct the wrapping machine to apply the wrap pattern based on the values.

16. The system of claim 15, wherein the controller is further configured to determine that a first pallet has a first height and a first product type, a second pallet has a second height and a second product type, wherein the controller is configured to apply a first wrap pattern to the first pallet and a second wrap pattern to the second pallet.

17. The system of claim 16, wherein the first height is equal to second height, and wherein the first wrap pattern is different from the second wrap pattern.

18. The system of claim 15, wherein one of the sensors is a camera, and wherein the camera is configured to detect a misaligned load based on a comparison between a structure/configuration of the load on the pallet and a predefined structure/configuration.

19. A system comprising:

a wrapping machine for dispensing film to wrap a product disposed on a pallet, wherein the machine comprises a movable arm and a rotating table, and wherein the pallet and the product are disposed on the rotating table during a wrapping operation;

a plurality of sensors disposed external to the machine and configured to detect operation of the machine; and a controller operably and communicatively connected with the sensors and configured to detect a value of a parameter indicative of the product and apply a wrap pattern based on the value, wherein the controller is further configured to determine that a first pallet has a first height and a first product type, a second pallet has a second height and a second product type, wherein the controller is configured to apply a first wrap pattern to the first pallet and a second wrap pattern to the second pallet, and wherein the first product type is different from the second product type, and wherein the first wrap pattern and the second wrap pattern are same.

20. The system of claim 19, wherein the parameter is one of height of the load, width of the load, weight of the load, a type of the product, and a name of the product.

21. The system of claim 19, wherein one of the sensors is a camera, wherein the camera is configured to detect a misaligned load based on a comparison between a structure/configuration of the load on the pallet and a predefined structure/configuration, and wherein, in response to the detecting the misaligned load, the controller is configured to issue a command to adjust operation of the wrapping machine.

22. A system comprising:

a wrapping machine for dispensing film to wrap a load disposed on a pallet;

a plurality of sensors configured to detect operation of the machine; and a controller operably and communicatively connected with the sensors and configured to:

establish desired values of operating parameters of the wrapping machine, the parameters including a wrap pattern, weight of the film, a number of revolutions, a percent of stretch of the film, and a tension of film, during operation of the machine, monitor actual values of the operating parameters using data from the sensors, and in response to a difference between the desired values and the actual values being greater than a threshold, issue a command to the wrapping machine during operation of the wrapping machine to automatically adjust operation of the wrapping machine such that the difference is less than the threshold, wherein the controller is configured to:

communicate with other wrapping machines to receive values of operating parameters of the other wrapping machines, the parameters including a wrap pattern, weight of the film, a number of revolutions, a percent of stretch of the film, and a tension of film, consider the values of operating parameters of the other wrapping machines when issuing the command to the wrapping machine to adjust operation of the wrapping machine.

23. A system comprising:

a wrapping machine for dispensing film to wrap a load disposed on a pallet;

a plurality of sensors configured to detect operation of the machine; and a controller operably and communicatively connected with the sensors and configured to:

establish desired values of operating parameters of the wrapping machine, the parameters including a wrap pattern, weight of the film, a number of revolutions, a percent of stretch of the film, and a tension of film, during operation of the machine, monitor actual values of the operating parameters using data from the sensors, and in response to a difference between the desired values and the actual values being greater than a threshold, issue a command to the wrapping machine during operation of the wrapping machine to automatically adjust operation of the wrapping machine such that the difference is less than the threshold, wherein the parameters further include condition of the wrapping machine, age of the wrapping machine, and type of wrapping machine.

24. A system comprising:

a wrapping machine for dispensing film to wrap a load disposed on a pallet;

a plurality of sensors configured to detect operation of the machine; and a controller operably and communicatively connected with the sensors and configured to:

establish desired values of operating parameters of the wrapping machine, the parameters including a wrap pattern, weight of the film, a number of revolutions, a percent of stretch of the film, and a tension of film, during operation of the machine, monitor actual values of the operating parameters using data from the sensors, and in response to a difference between the desired values and the actual values being greater than a threshold, issue a command to the wrapping machine during operation of the wrapping machine to automatically adjust operation of the wrapping machine such that the difference is less than the threshold, wherein the controller is configured to communicate with other wrapping machines, and wherein at least one of the other wrapping machines is a different type of wrapping machine compared to the wrapping machine of the system.

\* \* \* \* \*

UNITED STATES PATENT AND TRADEMARK OFFICE
CERTIFICATE OF CORRECTION

PATENT NO. : 12,291,369 B2
APPLICATION NO. : 17/738405
DATED : May 6, 2025
INVENTOR(S) : Nekkanti Page 1 of 1

It is certified that error appears in the above-identified patent and that said Letters Patent is hereby corrected as shown below:

In the Claims

Column 14, Claim 10, Line 30, please delete "wherein to sensor" and insert -- wherein the sensor --.

Signed and Sealed this
Tenth Day of June, 2025

Coke Morgan Stewart
*Acting Director of the United States Patent and Trademark Office*